(12) United States Patent
Yasuda

(10) Patent No.: US 8,189,211 B2  
(45) Date of Patent: May 29, 2012

(54) IMAGE PROCESSING SYSTEM

(75) Inventor: Naohiro Yasuda, Isehara (JP)

(73) Assignee: Ricoh Company, Ltd., Tokyo (JP)

( * ) Notice: Subject to any disclaimer, the term of this patent is extended or adjusted under 35 U.S.C. 154(b) by 501 days.

(21) Appl. No.: 12/382,529

(22) Filed: Mar. 18, 2009

(65) Prior Publication Data

US 2009/0237700 A1    Sep. 24, 2009

(30) Foreign Application Priority Data

Mar. 19, 2008 (JP) ................ 2008-072612  
Apr. 17, 2008 (JP) ................ 2008-108105

(51) Int. Cl.  
*G06F 3/12* (2006.01)

(52) U.S. Cl. ...... 358/1.13; 358/1.15; 358/448; 358/453; 358/462; 358/464; 705/52; 705/57; 713/176; 726/26; 726/27; 726/30

(58) Field of Classification Search .............. None  
See application file for complete search history.

(56) References Cited

U.S. PATENT DOCUMENTS 7,079,278 B2 * 7/2006 Sato ............................ 358/1.15  
7,230,739 B2 * 6/2007 Takahashi ................... 358/2.1  
7,738,143 B2 * 6/2010 Ishimoto et al. ............ 358/3.28

FOREIGN PATENT DOCUMENTS

JP   2006-287707   10/2006  
JP   2007-047579    2/2007

* cited by examiner

*Primary Examiner* — Chan S. Park  
*Assistant Examiner* — John Wallace  
(74) *Attorney, Agent, or Firm* — Harness, Dickey & Pierce, P.L.C.

(57) ABSTRACT

An image processing unit includes an image data input unit, a page-description language (PDL) converter, a special document determination unit, and an image treatment command adding unit. The image data input unit inputs image data. The PDL converter converts the input image data to page-description language data, and transmits an end-of-page command when a page-description language conversion for image data is completed. The special document determination unit determines whether the input image data includes a special document. The image treatment command adding unit instructs the PDL converter to wait for a transmission of the end-of-page command until the special document determination unit issues a determination result. When it is determined that the image data includes a special document, the image treatment command adding unit generates an image treatment command for the image data. The image treatment command adding unit transmits the image treatment command with the end-of-page command.

15 Claims, 9 Drawing Sheets

IMAGE PROCESSING SYSTEM

CROSS-REFERENCE TO RELATED APPLICATIONS

This application claims priority under 35 U.S.C. 119(a) to Japanese Patent Application Nos. 2008-072612, filed on Mar. 19, 2008, and 2008-108105, filed on Apr. 17, 2008 in the Japan Patent Office, the entire contents each of which are hereby incorporated by reference herein.

BACKGROUND OF THE INVENTION

1. Field of the Invention

The present disclosure generally relates to a system for processing image data using one or more image processing units, and more particularly, to a system that can process special image data such as paper currency or stock certificates, which by their nature pose special problems of copying, printing, display, and storage.

2. Description of the Background Art

For obvious reasons, certain documents, such as paper currency and stock certificates, must by nature be made difficult to counterfeit by copying.

Accordingly, multi-functional image forming apparatuses, such as digital color multi-functional peripherals, are often equipped with a copy-prohibition function that prevents proper copying even when certain types of documents are scanned, so that the copied document is not used for illicit purposes.

Specifically, when the image forming apparatus equipped with such a copy-prohibit function scans the document, the image forming apparatus can detect that the document is a copy-prohibited document (hereinafter also sometimes referred to as a "special document") and processes the document differently from an ordinary document, for example by blotting out the entire image with a pattern if the scanned document is a special document. As a result, the copy of the special document that is output is not a normal, usable image. JP-2006-287707-A, for example, discloses such a method.

However, this conventional approach may have drawbacks. For example, even if scanned image data does not include a special document, the scanned image data cannot be output to an external environment of the image processing apparatus (e.g., an external device connected to the image processing apparatus) until it is determined that the scanned image data does not include a special document. Accordingly, the scanned image data may need to be retained temporarily until the special document determination is completed, by which a time for completing image forming such as copying may become undesirably longer. If a detection processing speed for special document becomes slower than an image inputting speed or image scanning speed, a throughput of image processing system as a whole declines due to a delay at the detection processing.

To return to JP-2006-287707-A as an illustration of the above-described drawback, this application discloses an image processing apparatus that includes an image output unit for conducting an image treatment process, and a memory unit for conducting a specific image treatment process to prevent a storage and output of copy-prohibited special document image data (e.g., paper currency, stock certificates) while maintaining a performance of first copy time (e.g., time to copy image).

In such an image processing apparatus, if a special document is detected, the image output unit may conduct a special image processing, which fills an entire image with a given pattern using image data of raster image. In such a configuration, the special image processing may be conducted after checking all input image data. Accordingly, it can be determined for the first time that special document is included in the input image data only after the all input image data is checked.

Therefore, until it is determined whether a special document is included or not in the input image data, no image data can be output (e.g., transfer) outside the image processing apparatus. In other words, a detection result for input image data, which indicates whether or not the image data includes a special document, is required before outputting image data from the image processing apparatus. Thus, for example, if a special document is included only at a last part of input image data, a longer time is required to issue such detection result.

Therefore, if an image processing system is comprised of an image processing apparatus and an output unit (e.g., printer or the like), a data transmission time from the image processing apparatus to the printer may become undesirably longer because even a part of input image data cannot be output from the image processing apparatus until all the input image data is checked.

A detailed description is now given of the exact steps in conventional processing described above with reference to FIG. 1.

Figure 1:
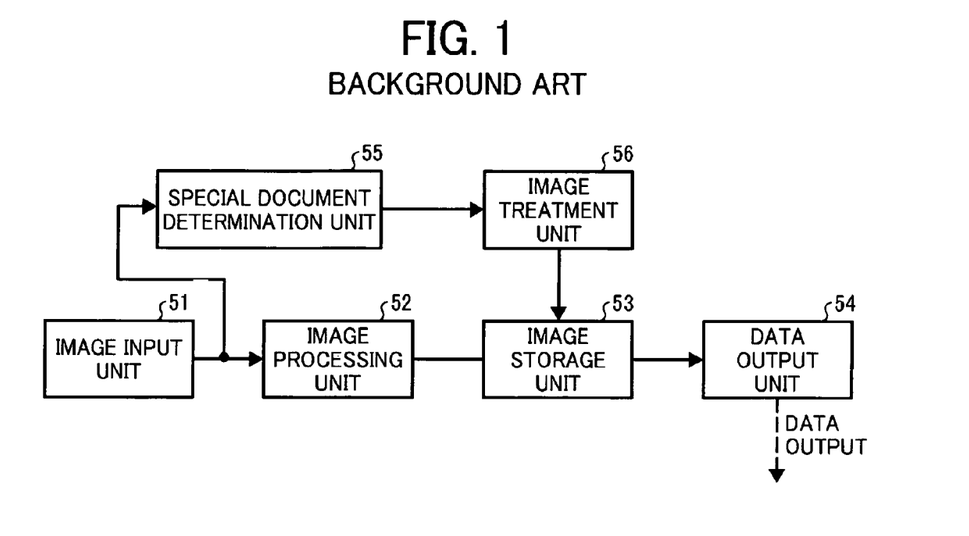
FIG. 1 shows a block diagram of a conventional image processing system having a special document determination function.

FIG. 1 shows a block diagram of a conventional image processing system having a special document determination function. The image processing system for inputting and outputting image data includes an image input unit 51, an image processing unit 52, an image storage unit 53, a data output unit 54, a special document determination unit 55, and an image treatment unit 56, for example.

The image input unit 51 may be a document scanner provided for a copier, for example, in which document data is read and converted into digital data, and then input to an image processing apparatus. The input image data is then transmitted to the image processing unit 52, which conducts normal image processing, and in parallel, the input image data is transmitted to the special document determination unit 55. The special document determination unit 55 detects whether the input image data includes a copy-prohibited document (e.g., paper currency). The special document determination unit 55 is provided independently from the image processing unit 52.

After the image processing unit 52 conducts an image processing to the input image data, and the image data is sequentially stored to the image storage unit 53. While the image data is being stored to the image storage unit 53, the special document determination unit 55 continuously conducts a detection process for the input image data to check whether the input image data includes a special document. When one page of the input image data is checked, the special document determination unit 55 transmits the determination result to the image treatment unit 56. If the determination result is "special document is included," the image treatment unit 56 conducts an image treatment process to the image data for one page stored in the image storage unit 53. For example, a given pattern (e.g., dots-printed pattern) may be filled on a whole-face of printed image.

If the determination result of the special document determination unit 55 is "special document is not included," the image treatment unit 56 does not conduct an image treatment to the image data.

Then, the data output unit 54 outputs image data for one page stored in the image storage unit 53 to an external unit (e.g., printer or the like). If a copier is used as an image processing apparatus, the data output unit 54 may be an image printing unit, which may prepare data for image printing.

However, in such a conventional image processing apparatus, the image storage unit 53 needs to retain image data that needs to be checked by the above-described determination process until the special document determination unit 55 can complete a determination process and issues a determination result for input image data. Typically, input image data for one page is checked as one image data in the above-described determination process. Accordingly, until a whole of input image data is completely checked, a determination result cannot be issued. Such process may be required to prevent outputting a part or whole of a copy-prohibited document externally (e.g., as printed sheet, as electronic data).

Accordingly, if the special document determination unit 55 may need to conduct the above-described determination process for a given time duration that is longer than a processing time required by the image processing unit 52, a total time for completing a whole process (i.e., a time from inputting image data input to outputting the image data such as printing) may undesirably become longer because of the above-described determination process that determines whether a special document is included.

SUMMARY

In one aspect of the invention, an image processing unit includes an image data input unit, a page-description language (PDL) converter, a special document determination unit, and an image treatment command adding unit. The image data input unit inputs image data. The PDL converter converts the input image data input by the image data input unit to page-description language data, and transmits an end-of-page command when a page-description language conversion for image data for one page is completed. The special document determination unit determines whether the input image data includes image data having a special document for each page. The image treatment command adding unit to instruct the PDL converter to wait for a transmission of the end-of-page command until the special document determination unit issues a determination result. The image treatment command adding unit generates an image treatment command, using a PDL command, that instructs a given specific image treatment for image data for one page when the special document determination unit determines that the determination result includes image data having a special document. The image treatment command adding unit transmits the image treatment command before or simultaneously with the end-of-page command.

In another aspect of the invention, an image scanning unit includes an image scanning device, a page-description language (PDL) converter, a special document determination unit, and an image treatment command adding unit. The image scanning device reads document image and outputs image data. The PDL converter converts the input image data input by the image data input unit to page-description language data, and transmits an end-of-page command when a page-description language conversion for image data for one page is completed. The special document determination unit determines whether the input image data includes image data having a special document for each page. The image treatment command adding unit to instruct the PDL converter to wait for a transmission of the end-of-page command until the special document determination unit issues a determination result. The image treatment command adding unit generates an image treatment command, using a PDL command, that instructs a given specific image treatment for image data for one page when the special document determination unit determines that the determination result includes image data having a special document. The image treatment command adding unit transmits the image treatment command before or simultaneously with the end-of-page command.

In another aspect of the invention, a method of controlling an image processing for special document includes the steps of inputting, converting, transmitting, determining, instructing, generating, and transmitting. The inputting step inputs image data using an image data input unit. The converting step converts the input image data to page-description language data using a page description language (PDL) converter. The transmitting step transmits an end-of-page command when the page-description language conversation for image data for one page is completed. The determining step determines whether the input image data for a given one page includes a special document using a special document determination unit. The instructing step instructs to wait for a transmission of the end-of-page command until a determination result is issued by a special document determination unit. The generating step generates an image treatment command, using PDL command, which instructs a given specific image treatment to image data for the given one page when the special document determination unit determines that a determination result indicates the image data includes a special document. The transmitting step transmits the image treatment command before or simultaneously with the end-of-page command.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict example embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXAMPLE EMBODIMENTS

A description is now given of example embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing expanded views shown in the drawings, specific terminology is employed for the sake of clarity, the present disclosure is not limited to the specific terminology so selected and it is to be understood that each specific element includes all technical equivalents that operate in a similar manner.

Referring now to the drawings, image processing systems or apparatuses according to example embodiments are described with reference to accompanying drawings.

Figure 2:
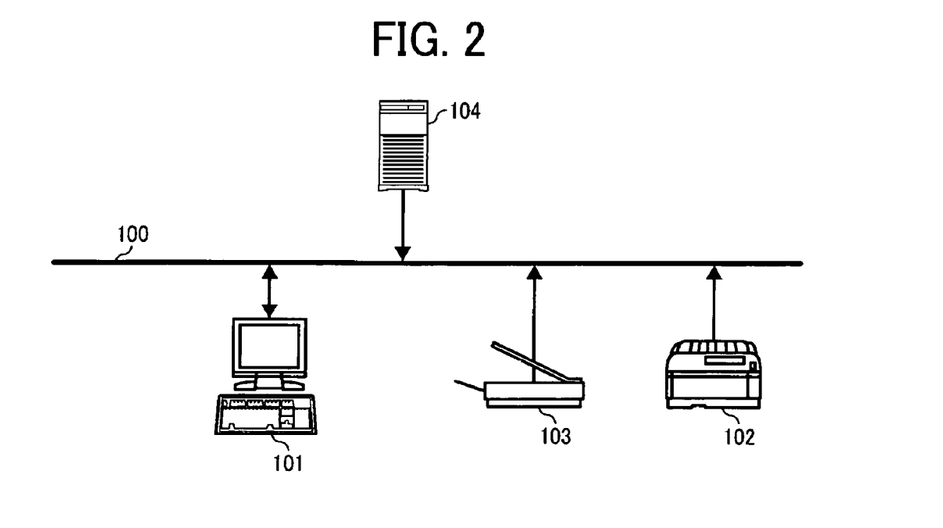
FIG. 2 shows one example environment for an image processing system according to an exemplary embodiment.

Hereinafter, an image processing system according to an example embodiment is explained with reference to FIGS. 2 and 3. FIG. 2 shows one example of an image processing system used in a given environment. In such environment, an information processing apparatus 101, a printer 102, a scanner 103, and a server 104 may be connected each other via a network 100 to communicate data each other. The information processing apparatus 101 may be a personal computer (PC), the printer 102 prints out images, the scanner 103 scans images, and the server 104 stores image data. The network 100 may be local area network (LAN), an intranet, or the like, which can be used for data transmission.

The information processing apparatus 101 may function as an image processing apparatus or unit. In such a configuration, a combination of the scanner 103, the information processing apparatus 101, and the printer 102 may be configured as an "image generation system" such as an "image output system"; and a combination of the scanner 103, the information processing apparatus 101, and the server 104 may be configured as an "image generation system" such as an "image storing system." The scanner 103 may be omitted from such configuration if the information processing apparatus 101 includes image processing function and image scanning function or if the information processing apparatus 101 receives image data from other apparatus via the network 100.

Further, the scanner 103 or the printer 102 may be provided with a function of image processing according to an exemplary embodiment in another configuration. Further, a digitally-controlled multi-functional apparatus including functions of the scanner 103 and the printer 102 may be provided with a function of image processing according to an exemplary embodiment. The network 100 used as a data communication bus may be a wireless local area network (wLAN), an optical network, a public telephone network, or the Internet, for example. Instead of using the network 100, each of the apparatuses can be directly connected each other using USB (universal serial bus) cables, for example.

Figure 3:
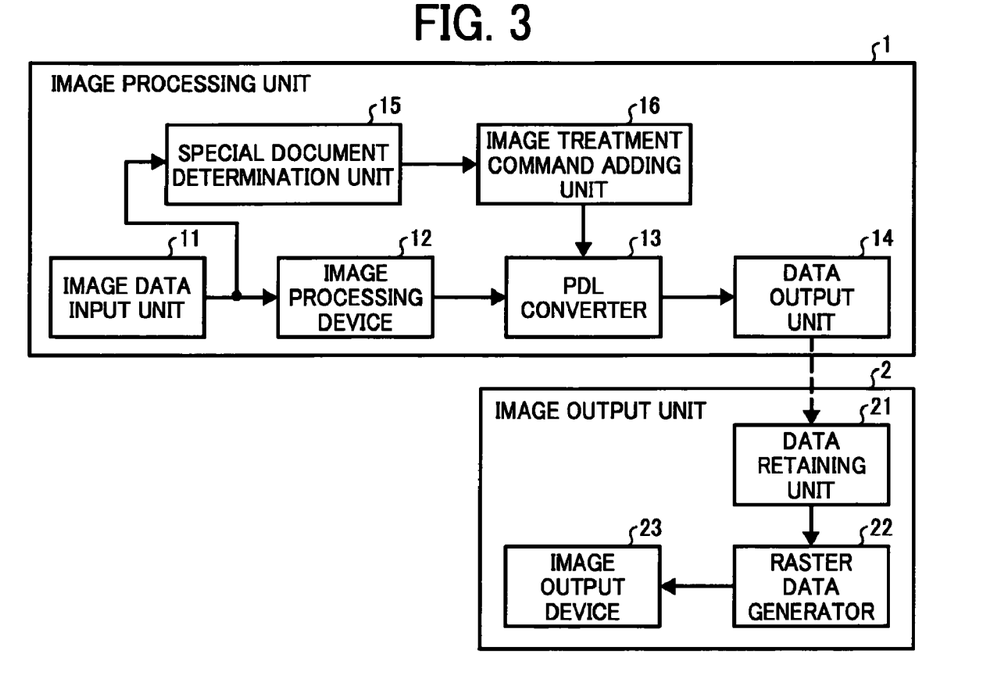
FIG. 3 shows a block diagram of an image processing system having an image processing unit according to an exemplary embodiment.

FIG. 3 shows a block diagram of an image processing system employing an image processing unit 1 according to an exemplary embodiment and an image output unit 2 connected to the image processing unit 1. A controller for controlling each unit is omitted from FIG. 3. Further, a part or all of functions conducted by each unit shown in FIG. 3 may be put into practice using a software program (e.g., application program).

As shown in FIG. 3, the image processing unit 1 includes an image data input unit 11, an image processing device 12, a PDL (page description language) converter 13, a data output unit 14, a special document determination unit 15, and an image treatment command adding unit 16, for example.

The image data input unit 11 may receive image data from the scanner 103 or other apparatus via the network 100 (see FIG. 2), in which the scanner 103 scans image data of document image. If the image data is analog data, the data may be converted into digital data, and then transmitted to the image processing device 12 and the special document determination unit 15.

Further, the image data input unit 11 may receive image data from e-mail or an external scanner using scan-to-folder function, for example.

Figure 4:
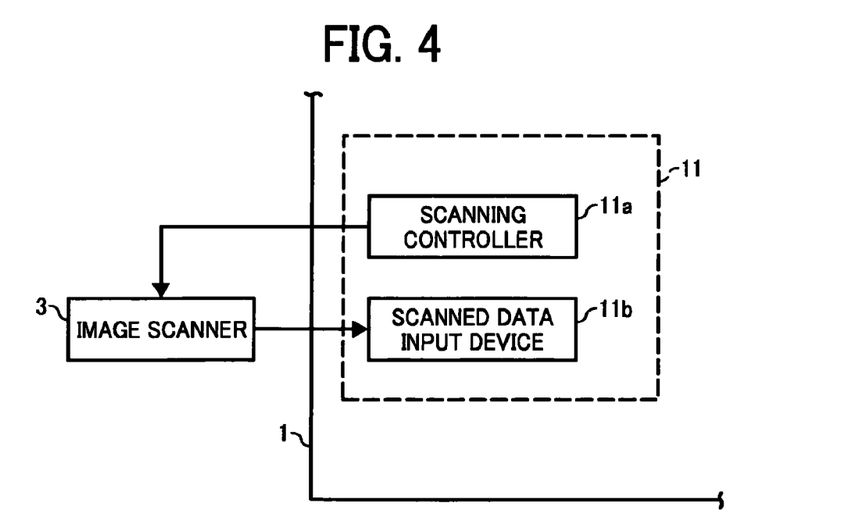
FIG. 4 shows an image scanner connected to the image processing system of FIG. 3.

Further, the image processing unit 1 may be connected to an image scanner 3 as shown in FIG. 4, in which the image data input unit 11 may be configured with a scanning controller 11a and a scanned data input device 11b. The scanning controller 11a controls the image scanner 3 to scan document image, and the scanned data input device 11b receives and inputs scanned image data. The scanning controller 11a may be TWAIN (Toolkit without an Any interesting Important name) driver, WIA (Windows Image Acquisition) driver, or the like.

The image processing device 12 conducts normal image processing to the input image data such as for example a filtering process, a gamma correction process, a scaling function process, or the like. The image processing device 12 may be omitted from a configuration in an exemplary embodiment.

The special document determination unit 15 determines whether the input image data includes image data of special document (e.g., copy-prohibited document such as paper currency, stock certificates). Such determination process can be conducted by a conventional pattern matching process, in which input image data may be compared to a given pattern stored in advance that characterizes a special document. Such pattern matching process can be conducted with a conventional method. The special document determination unit 15 conducts its determination process independently while the image processing device 12 conducts normal image processing. Accordingly, the image processing device 12 and the special document determination unit 15 can conduct respective image processing in a parallel manner.

When the image processing device 12 completes a normal image processing to the input image data, the PDL (page description language) converter 13 converts the image data to PDL data using a draw command such as for example PostScript® or the like. Then, the data output unit 14 sequentially outputs the PDL data. Upon completing conversion of image data to PDL data for one page, the end-of-page command may be output. Typically, PDL may be used as a language for printer application. For example, PDL can be used to transfer image data from a printer driver of a personal computer PC to a printer (i.e., image printing apparatus) as a command. The PDL can enhance a data transmission speed between the personal computer PC and the printer, and a high-level PDL can preferably realize higher freedom for drawing function. In an exemplary embodiment, image data converted to PDL data can be output to an external apparatus by the data output unit 14 via a data communication bus such as for example USB cable and network.

The special document determination unit 15 can be used to detect a special document pattern included in image data, input by the image data input unit 11. If the special document pattern is detected, an input image data is determined as a special document. If a special document pattern is not detected when the input image data for one page is checked to the end of input image data in the determination process, the input image data is determined as a non-special document. Then, the determination result is transmitted to the image treatment command adding unit 16.

The image treatment command adding unit 16 instructs the PDL converter 13 to wait outputting an end-of-page command even if the image data for one page is already converted to PDL data until the special document determination unit 15 outputs a determination result.

If the special document determination unit 15 determines that the input image data includes special document and then issues a corresponding determination result, the image treatment command adding unit 16 generates an image treatment command that instructs a given specific image treatment for the image data for one page using PDL command. The image treatment command may be output before the end-of-page command, or output at the same time with the end-of-page command. If the special document determination unit 15 determines that image data dose not include special document (i.e., no special document), and then issues a corresponding determination result, the end-of-page command alone is output.

Accordingly, when the special document determination unit 15 issues a determination result, the data output unit 14 outputs an end-of-page command alone to an external apparatus, or the data output unit 14 outputs both of an image treatment command and an end-of-page command to an external apparatus. At such timing of outputting the end-of-page command and the image treatment command, PDL data for one page except the commands (i.e., end-of-page command and image treatment command) has already been output.

Because PDL can describe a command of image treatment for whole image data, wherein such whole image data include image data that has been already output outside. Accordingly, a given image treatment can be conducted for the already output image data by outputting an image treatment command after outputting image data of PDL data. Further, until the end-of-page command is output, the image data of a given page already output outside as PDL data cannot be generated as raster data (e.g., bitmap data) in an external apparatus.

Accordingly, although the special document determination processing may need a given time duration, PDL-converted image data can be output to an external apparatus during the special document determination processing. Accordingly, a throughput of image processing system as a whole can be maintained at a higher level (or a decrease of throughput of image processing system can be prevented). In the configuration shown in FIG. 3, image data is output to the image output unit 2, for example, which may be used as an image output apparatus (e.g., printer). The image output unit 2 includes a data retaining unit 21, a raster data generator 22, and an image output device 23, for example.

The data retaining unit 21 may be a buffer memory which can temporarily retain the PDL data transmitted from the data output unit 14 of the image processing unit 1 via a data communication bus.

The raster data generator 22 generates raster data based on the PDL data for a given page retained in the data retaining unit 21 when the raster data generator 22 receives the end-of-page command. If the raster data generator 22 receives an image treatment command with an end-of-page command, the raster data generator 22 conducts a given specific image treatment to a whole area of image data when generating raster data for a given page, wherein the image treatment command may be received earlier than the end-of-page command or at the same time with the end-of-page command. Such given specific image treatment may be, for example, filling of given pattern on a whole face of image, meshing of half-tone dots on a whole face of image, overlapping a special pattern on a whole face of image, or superimposing large-sized characters or marks of "COPY" or "COPY-PROHIBITED" on an image.

The image output device 23 outputs the raster data generated by the raster data generator 22 as an image. For example, the image may be printed on a sheet or may be displayed on a display screen. The image output device 23 may be a printer engine when the image is printed on a sheet. The image output device 23 may be a display such as for example a display screen when the image is displayed. If the image output device 23 is a printer engine, the image output unit 2 may be a PDL-compatible printer, and the image output unit 2 may be configured with a scanner (used as an image reading apparatus) as an image copying system as a whole. Such PDL-compatible printer may be a typical PDL-compatible printer.

Figure 5:
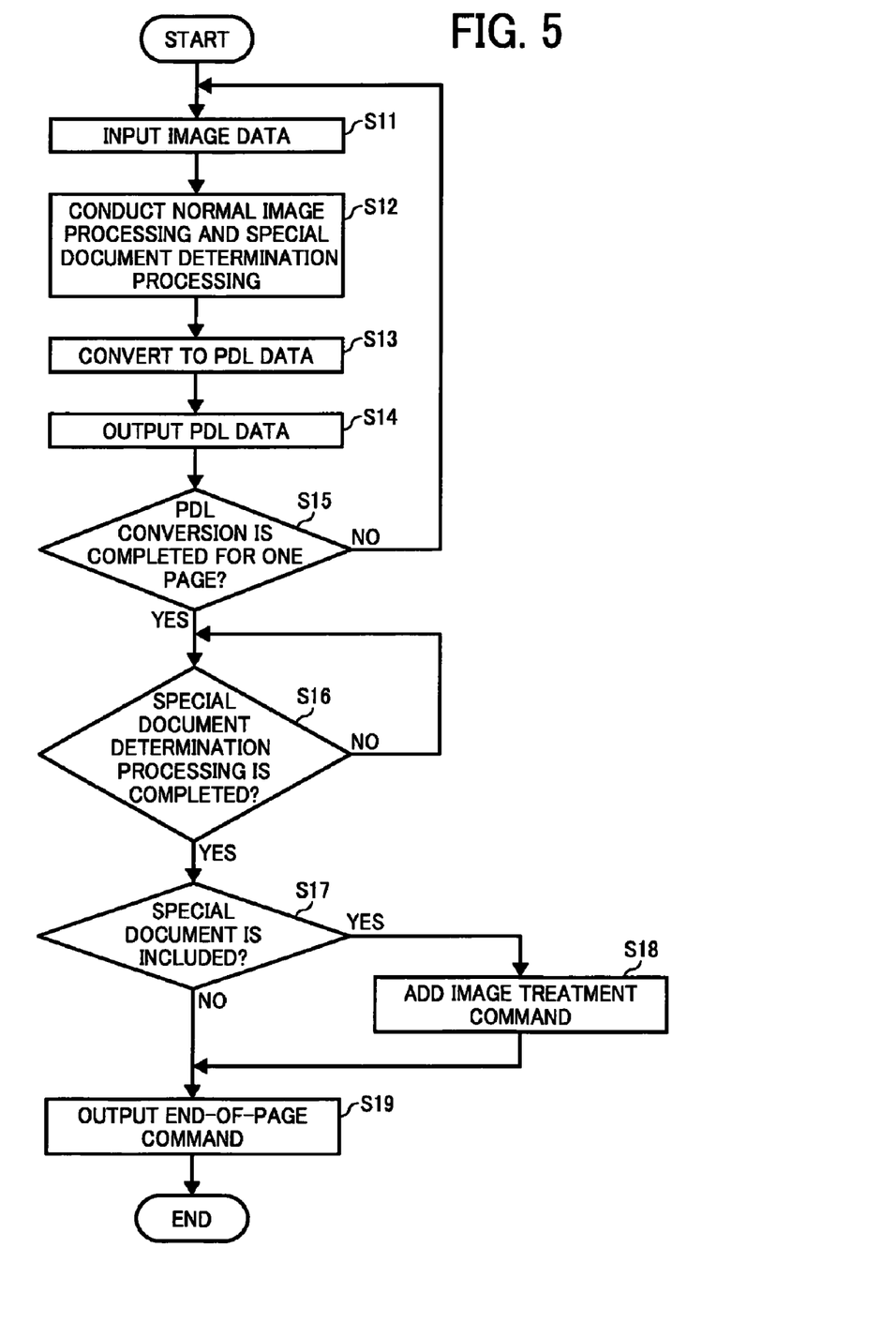
FIG. 5 shows a flowchart for processing image data in the image processing system of FIG. 3.

FIG. 5 shows a flowchart for image data processing in the image processing unit 1 of FIG. 3. Such image processing may be started when image data is input to the image data input unit 11 of FIG. 3.

At step S11, the image data is sequentially input to the image processing device 12 from the image data input unit 11.

At step S12, normal image processing and special document determination processing are conducted in parallel for the input image data. Such normal image processing may include a filtering process, a gamma correction process, a scaling function process, or the like, which may be conducted to convert or correct image data to another image data that is matched to a medium or a unit where the image data is to be output. Such normal image processing can be included or omitted in a configuration of the present invention. In the special document determination processing, the input image data may be determined whether the input image data includes a special document, such as for example copy-prohibited document (e.g., paper currency, stock certificates).

At step S13, the input image data processed by the normal image processing is sequentially converted to page-description language data (PDL data) by the PDL converter 13.

At step S14, the data output unit 14 outputs the PDL data sequentially to an external apparatus or the like, for example.

At step S15, it is determined whether PDL conversion process for one page is completed by the PDL converter 13. If the PDL conversion process for one page is determined as completed, an end-of-page command is generated and the process goes to step S16. If the PDL conversion process for one page is determined as not completed, the process goes back to step S11 to input image data, and then the above described steps S11 to S15 are repeated.

When the PDL conversion process for one page is determined as completed, the end-of-page command is generated and the process goes to step S16. At step S16, it is determined whether the special document determination processing by the special document determination unit 15 is completed. Specifically, a completion of special document determination processing is determined whether the special document determination unit 15 outputs a determination result to the image treatment command adding unit 16. When the determination result is input to the image treatment command adding unit 16 from the special document determination unit 15, the process goes to step S17.

At step S17, it is determined whether the determination result is "special document is included" or "special document is not included."

If the determination result is "special document is not included," the process goes to step S19, and the end-of-page command is transmitted, by which the process ends. On one hand, if the determination result is "special document is included," the process goes to step S18.

At step S18, the image treatment command adding unit 16 generates an image treatment command, which is a PDL command that instructs a given specific image treatment for the image data for one page, and then the image treatment command is added to the end-of-page command generated by the PDL converter 13. Then, the process goes to step S19.

At step S19, the end-of-page command added with the image treatment command is output to an external apparatus or device such as for example the image output unit 2 using the data output unit 14, by which the image data processing including the special document determination processing ends. In an exemplary embodiment, the image treatment command and the end-of-page command can be transmitted at a same timing, or the image treatment command can be transmitted before the end-of-page command.

Figure 6:
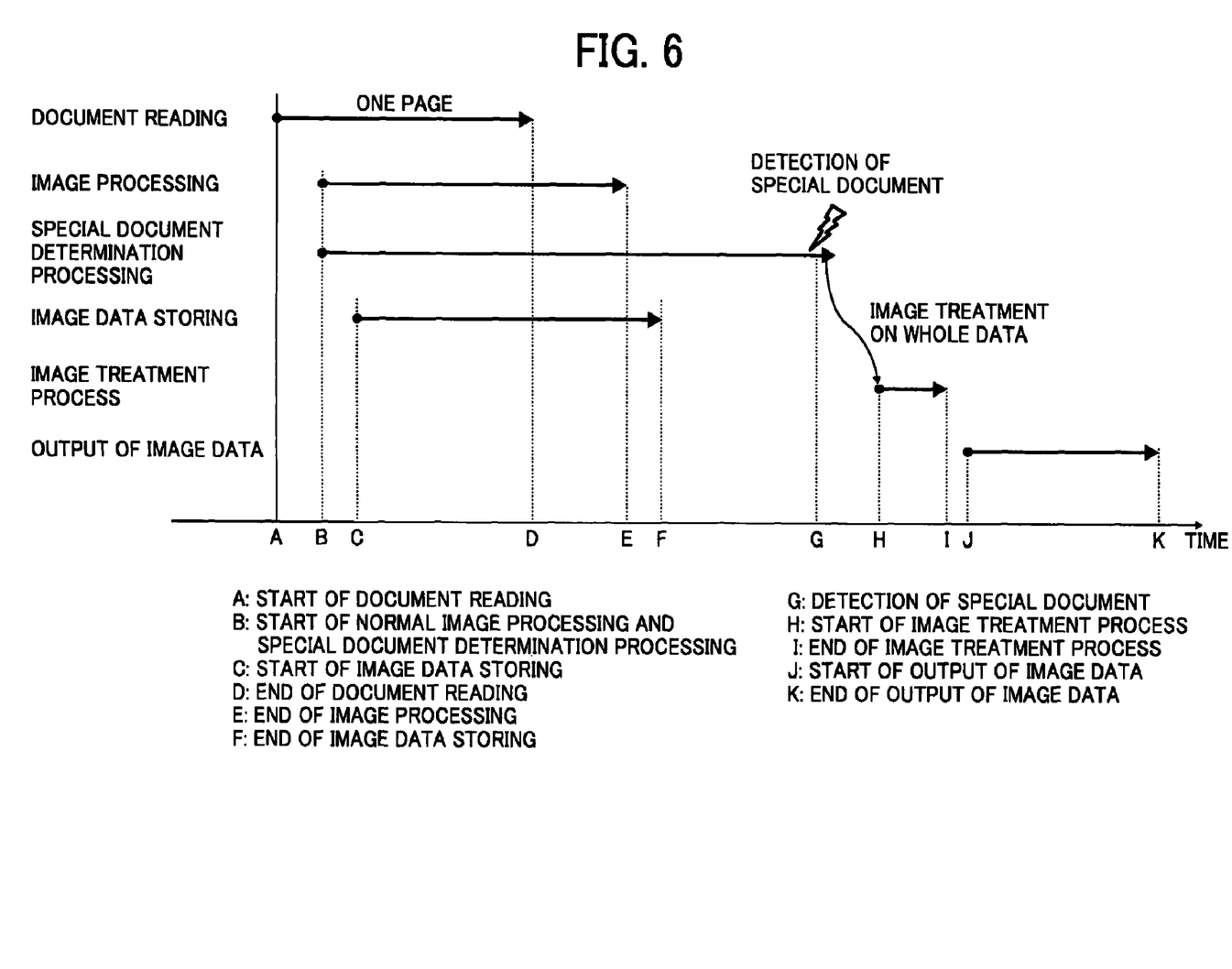
FIG. 6 shows a timing chart for processing image data using the conventional image processing unit of FIG. 1.
Figure 7:
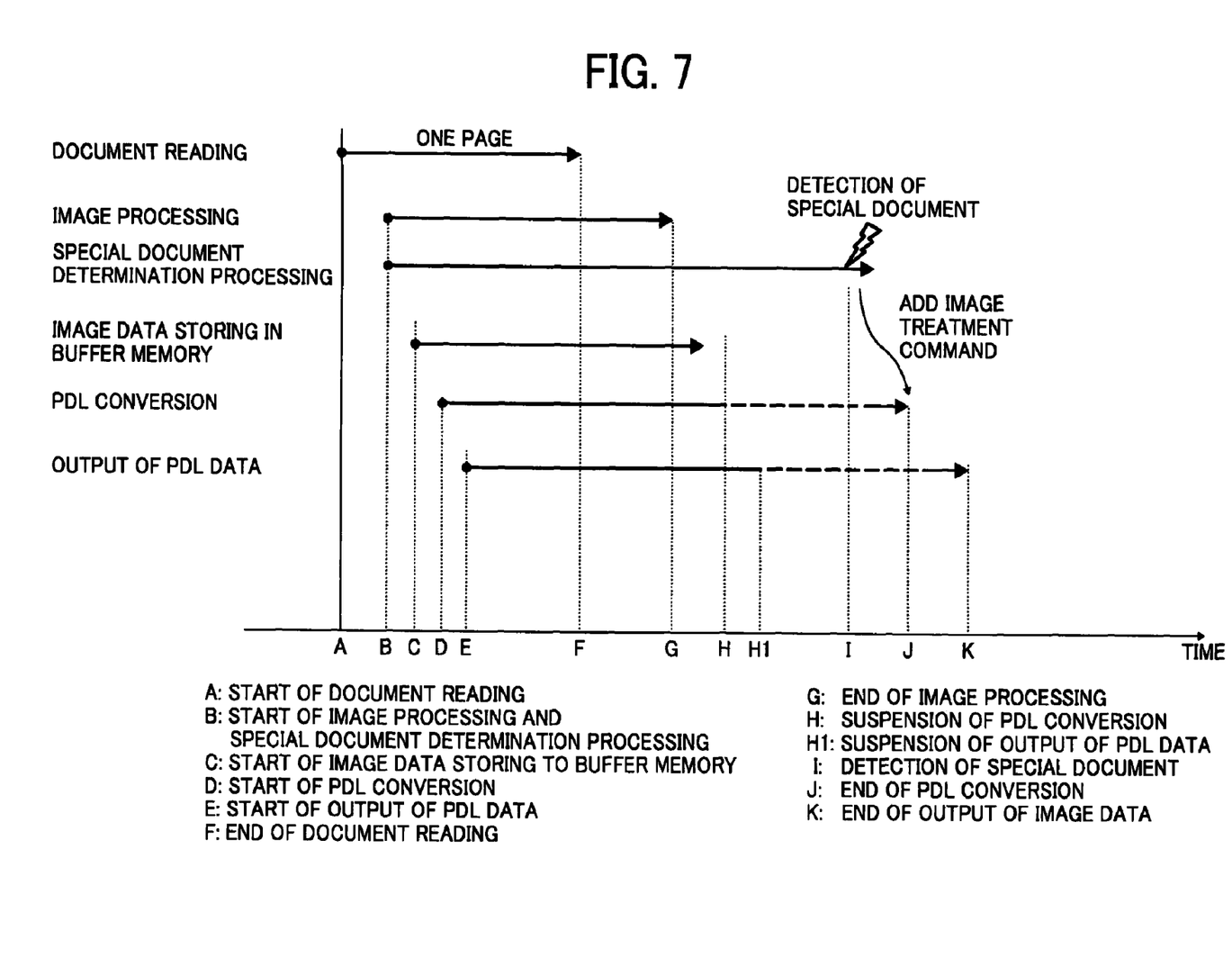
FIG. 7 shows a timing chart for processing image data using the image processing unit of FIG. 3.

An effect of shortening a time for image data processing including special document determination processing according to an exemplary embodiment is now described with reference to FIGS. 6 and 7. Image data processing using a conventional image processing unit (see FIG. 6) is compared with image data processing according to an exemplary embodiment (see FIG. 7). FIG. 6 shows a timing chart for processing image data using the conventional image processing unit of FIG. 1. FIG. 7 shows a timing chart for processing image data using the image processing unit 1 according to an exemplary embodiment shown in FIG. 3. In FIGS. 6 and 7, names of process steps are listed from upper to lower in the vertical axis, and the horizontal axis represents the time. Each of process steps has a given run-time indicated by a length of an arrow, and alphabet characters A to K (time point A to K) shows a start point and an end point of each of process steps.

At first, a conventional image data processing is described with reference to FIG. 6, and then the image data processing according to an exemplary embodiment is described with reference to FIG. 7.

In FIG. 6, at the time point A, a document reading step (or image data inputting) for a given one page starts. The input image data is then transmitted to an image processing unit or the like, in which a given time may be required for data transmission between the document reading and a start of processing input image data (i.e., a time between the time points A and B). Then, at the time point B, normal image processing and special document determination processing start concurrently while the document reading step is still conducted. The normal image processing is sequentially conducted for input image data. While the normal image processing is conducted, image data that has received the normal image processing can be sequentially stored in a memory, wherein such image data storing starts at the time point C. Accordingly, the document reading, the normal image processing for input image data, and the image data storing may be conducted concurrently in parallel during a time period between the time point C and the time point D.

The document reading (or image data inputting) ends at the time point D, and then the normal image processing ends at the time point E, which comes later than the time point D for some time. As shown in FIG. 6, the time point E is a total time including a time for waiting a start of the image processing (i.e., from the time points A to B) and a time required for the normal image processing (i.e., from the time points B to E). Then, the image data storing also ends at the time point F, which comes later than the time point E for some time.

However, the special document determination processing, simultaneously started with the normal image processing, may not end at the time point F because the special document determination processing may need to be conducted for all of input image data. For example, the special document determination processing may need a longer time for input image data because a data position of a special document pattern may vary depending on types of input image data (e.g., input image data may not include special document pattern, the input image data may include special document pattern at the end portion of the image data for one page). As such, the special document determination processing may not end at the time point F. Such unfavorable condition may occur when a special document determination processing is conducted by using a firmware, or by an externally added circuit which may need a longer time for data transmission. In such unfavorable condition, the image data needs to be retained until the determination result for special document is issued at the time point G (i.e., a time from the time points F to G is required).

In FIG. 6, the image data may include a special document at an end portion of image data, by which a time interval between the time points E and G may become longer, wherein the image processing ends at the time point E, and the special document is detected at the time point G. Accordingly, it can be determined that the input image includes the special document for the first time at the time point G, which comes relatively later than the time point E. Then, at the time point H, an image treatment process is started for the image data. Specifically, the image treatment process is conducted for image data for one page as a whole. At the time point I, the image treatment process ends. Then, the image data received the image treatment is started to output at the time point J and is end to output at the time point K. With conducting the above described process steps, the image data processing ends.

FIG. 6 shows one example that a special document is detected in the input image data. However, even if a special document is not detected in input image data (e.g., most of document used in actual situation may not include special document), a time for completing an image data processing as a whole may need a longer time similarly as in a case that a special document is detected in the input image data because only the image treatment process for image data (from the time points H to I) can be omitted but other steps and waiting time are required even if input image data has no special document. Accordingly, when a conventional image processing unit is used, a special document determination processing and an image treatment process to be conducted on image data may delay an image data processing as a whole (or a longer time may be required for image data processing).

Hereinafter, a timing chart for the image data processing to be conducted by the image processing unit 1 according to an exemplary embodiment is described with reference to FIG. 7.

In FIG. 7, at the time point A, a document reading step (or image data inputting) starts, and image data is input to the image processing unit 1 or the like, in which a given time may be required for data transmission between the document reading and a start of processing input image data (i.e., a time between the time points A and B). Then, at the time point B, normal image processing and special document determination processing may start concurrently while the document reading step is conducted. The normal image processing is sequentially conducted for input image data. While the normal image processing is conducted, the input image data that has received the image processing is sequentially stored in a buffer memory temporarily, wherein such data storing starts at the time point C. The buffer memory may be provided in the PDL converter 13, for example.

At the time point D, the image data is started to be converted to PDL data by the PDL converter 13. Then, the PDL-converted data is started to be output to the data output unit 14 at the time point E without waiting a completion of normal image processing for the image data for one page as a whole. The above-described processes are progressed in parallel from the time points E to F as shown in FIG. 7.

When the document reading (image data inputting) ends at the time point F, and when the normal image processing ends at the time point G, all of the input image data may be processed by the PDL conversion process. Then, the PDL conversion process is suspended from the time point H for some time, and then the PDL data output is also suspended from the time point H1, slightly later than the time point H. Such suspended period is indicated by a dotted line in FIG. 7.

During such suspended period, the special document determination processing may be still continued. When a special document is detected at the time point I, the image treatment command adding unit 16 or the like generates an image treatment command, using PDL command, in a time period between the time points I to J, which instructs a given specific image treatment for the image data for one page.

Then, at the time point J, the PDL converter 13 adds the image treatment command to the end-of-page command, and outputs the image treatment command and the end-of-page command, by which the PDL conversion process ends. After the end-of-page command added with the image treatment command is output, the PDL data outputting process ends at the time point K.

As above described, the PDL conversion process is suspended from the time point H, and then the PDL data output is also suspended from the time point H1 without completing the PDL conversion completely because the end-of-page command is not added yet to the PDL data. Such suspended PDL conversion process and PDL data output process may be resumed when the special document determination processing outputs a determination result.

In such an example case shown in FIG. 7, the image data (e.g., PDL data) can be output in parallel while the special document determination processing is conducted. When it is determined that the input image data includes a special document, remaining process that needs to be conducted is a process for generating an image treatment command, a process for adding the image treatment command to the end-of-page command, and a process for outputting the end-of-page command and the image treatment command. Accordingly, a total time of image data processing can be effectively shortened compared to a conventional configuration.

If image data (e.g., PDL data) is output and transferred to a PDL-compatible printer with the end-of-page command, the PDL data may be extracted as raster image after completing a data transfer process, and then may be printed by a printing unit. Although a given time is required to extract PDL data as raster image until a completion of the printing, such time may not become so long relative to a total time for processing image data (or total time for image processing system) if a printer is equipped with a high performance controller.

Figure 8:
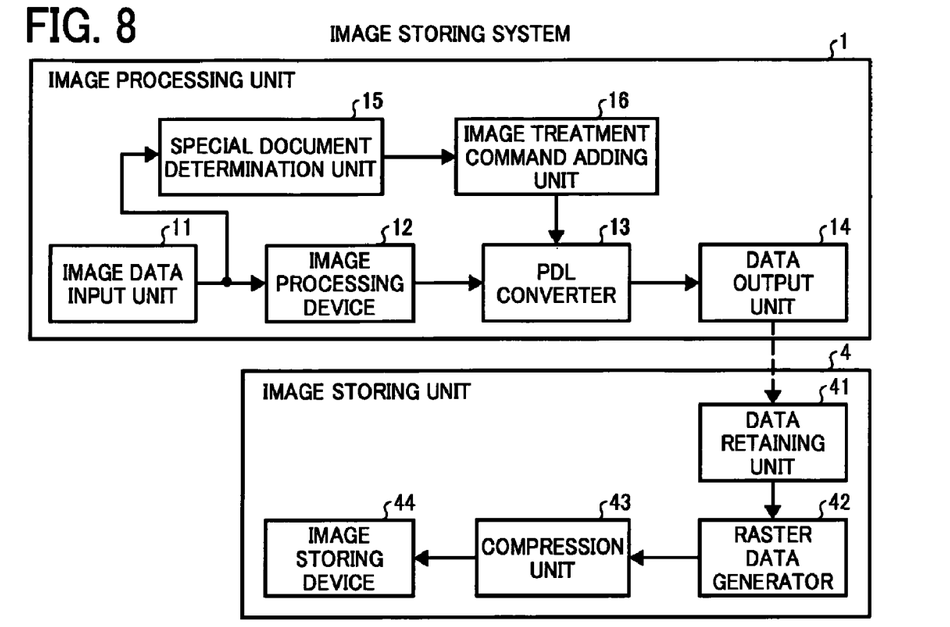
FIG. 8 shows a block diagram of an image storing system according to another exemplary embodiment.

A description is now given to an "image storing system" according to another exemplary embodiment with reference to FIG. 8. The "image storing system" includes the image processing unit 1 shown in FIG. 3, and an image storing unit 4, which receives image data (e.g., PDL data) from the image processing unit 1 via a data communication bus, for example. The image storing unit 4 may include a data retaining unit 41, a raster data generator 42, a compression unit 43, and an image storing device 44, for example. The data retaining unit 41 and the raster data generator 42 are equivalent to the data retaining unit 21 and the raster data generator 22 of the image output unit 2 shown in FIG. 3. The compression unit 43 compresses raster data generated by the raster data generator 42. The image storing device 44, which may be a hard-disk drive (HDD), and a USB (universal serial bus) memory, for example, stores the compressed data as image file, for example. Although the image storing device 44 can store image data in greater amount by reducing data amount using the compression unit 43, the compression unit 43 can be omitted from the configuration.

In such a configuration shown in FIG. 8, the image storing unit 4 may store an image file having image data including a special document. Because the image data for a given specific page having a special document may have received an image treatment process (e.g., filling a pattern on a whole area of image), such image data cannot be used for illicit purposes (e.g., forged certificate) even if the image data may be transferred to and then printed by a printer. Further, image data can be stored in the image storing device 44 as PDL data. When the image data is retrieved from the image storing device 44, the PDL data may be extracted as raster image, and then printed or displayed, for example. When the PDL data is extracted as raster image, a given specific image treatment can be conducted to the image data if an image treatment command exists, by which image data having a special document may not be used for illicit purposes.

Figure 9:
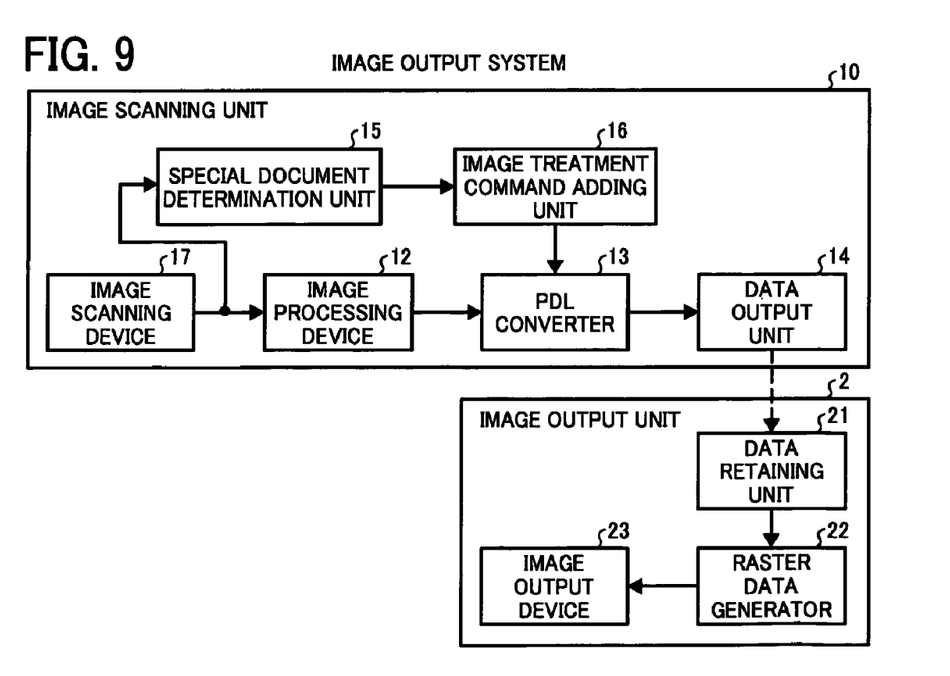
FIG. 9 shows a block diagram of an image output system according to another exemplary embodiment.

A description is now given to an "image output system" using an image scanning unit according embodiment to an exemplary with reference to FIG. 9. The "image output system" includes an image scanning unit 10, and the image output unit 2. Because the image output unit 2 is same as in FIG. 3, a description of the image output unit 2 is omitted. The image scanning unit 10 may include an image scanning device 17, which scans document image and outputs image data. The image scanning device 17 is a substitution of the image data input unit 11 of the image processing unit 1 of FIG. 3. The image scanning device 17 outputs image data, and then the PDL converter 13 sequentially converts the image data to PDL data. In such "image output system" configured with the image scanning unit 10 and the image output unit 2, PDL data can be transmitted from the image scanning unit 10 to the image output unit 2 via a data communication bus, for example. If the image output device 23 of the image output unit 2 is a printer engine of an image printing unit, the "image output system" may be a combination of a scanner and a printer as a whole, for example. If the image output device 23 of the image output unit 2 is a display unit, the "image output system" may be a combination of a scanner and a display (e.g., display screen) as a whole, for example.

Figure 10:
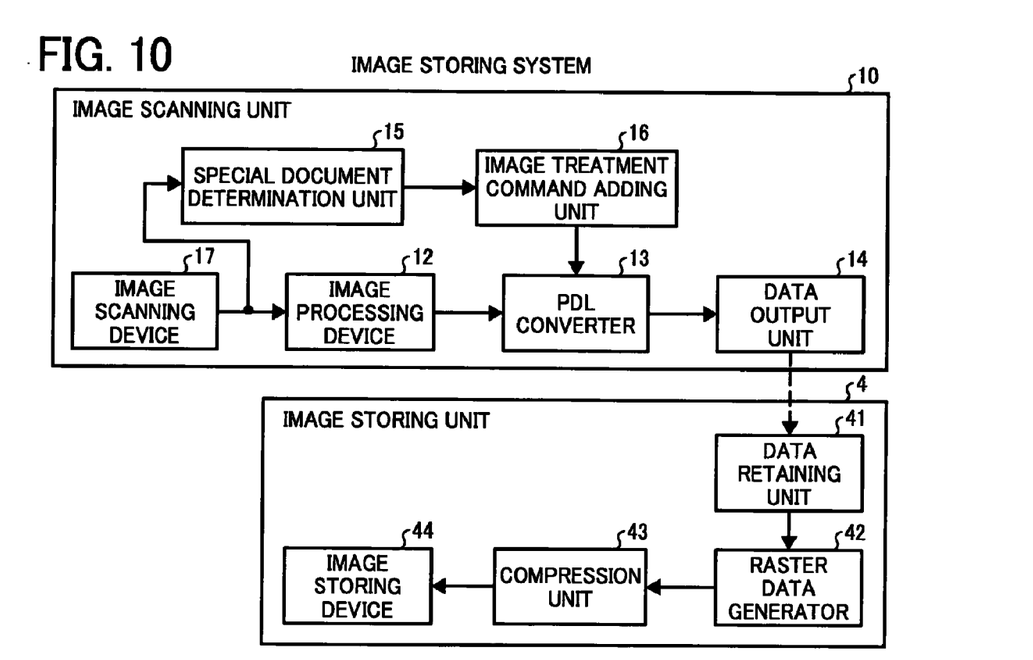
FIG. 10 shows a block diagram of an image storing system according to another exemplary embodiment.

A description is now given to an "image storing system" according to another exemplary embodiment with reference to FIG. 10. The "image storing system" is configured with the above-described image scanning unit 10 of FIG. 9, and the image storing unit 4 of FIG. 8. Accordingly, the "image storing system" may be configured as a data filing system equipped with a scanner as a whole, for example.

Figure 11:
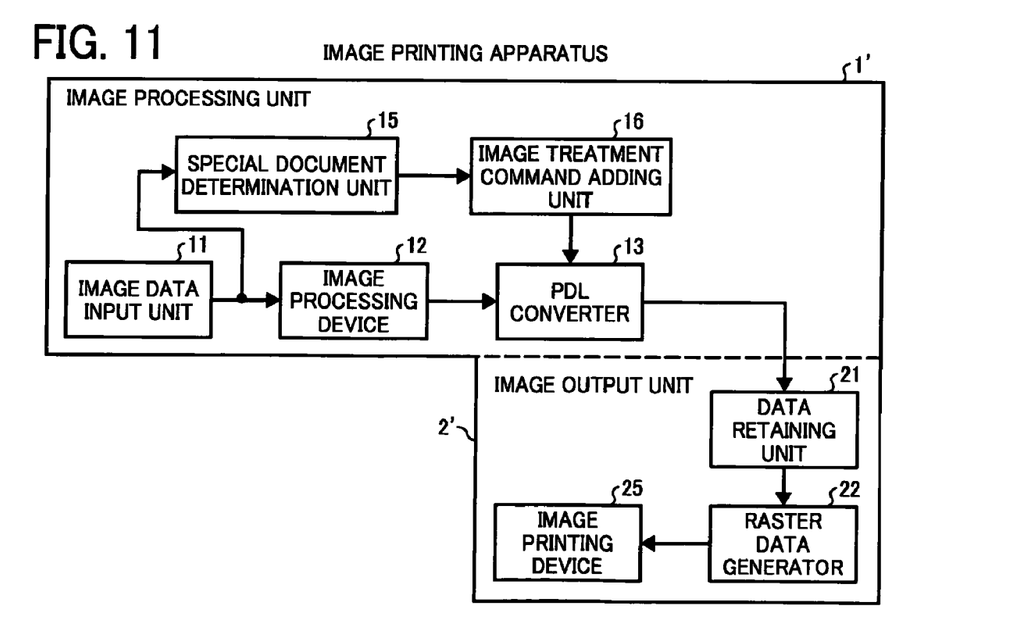
FIG. 11 shows a block diagram of an image printing apparatus according to another exemplary embodiment.

A description is now given to an "image printing apparatus" according to another exemplary embodiment with reference to FIG. 11. The image printing apparatus is configured with an image processing unit 1' and an image output unit 2'. The image processing unit 1' includes functional units as similar to the image processing unit 1 of FIG. 3 while excluding the data output unit 14. The image output unit 2' includes an image printing device 25 substituting the image output device 23 of the image output unit 2 of FIG. 3. The image printing device 25 can print raster data generated by the raster data generator 22 as an image on a sheet. The PDL converter 13 of the image processing unit 1' and the data retaining unit 21 of the image printing unit 2' may be connected each other by data communication line to transmit PDL data.

Figure 12:
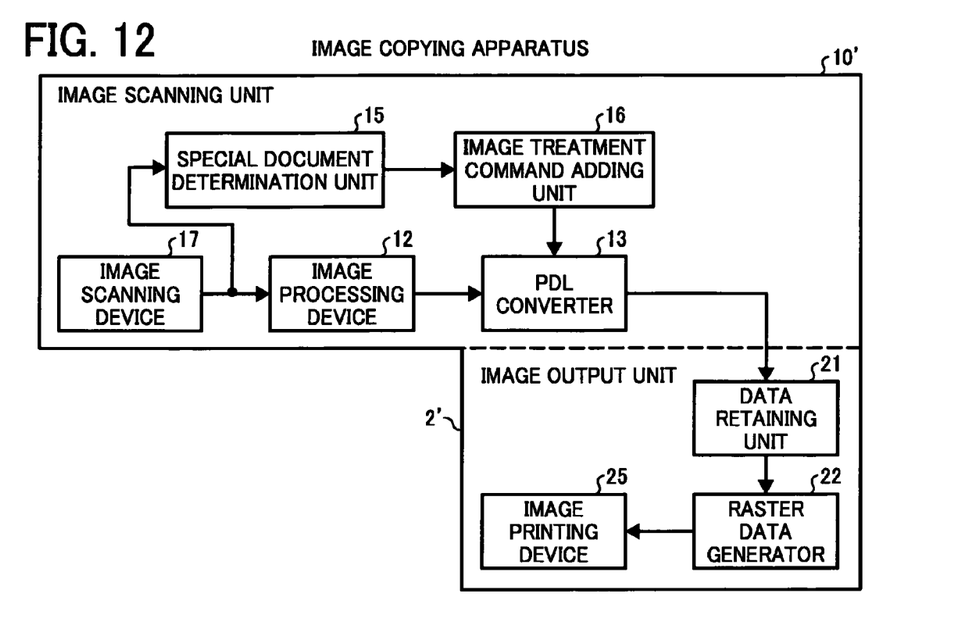
FIG. 12 shows a block diagram of an image copying apparatus according to another exemplary embodiment.

A description is now given to an "image copying apparatus" according to another exemplary embodiment with reference to FIG. 12. The image copying apparatus is configured with an image scanning unit 10' and the image output unit 2' shown in FIG. 11. The image scanning unit 10' includes functional units as similar to the image scanning unit 10 of FIG. 9 while excluding the data output unit 14. The "image copying apparatus" may be a digital copier or a digital multi-functional apparatus as a whole, for example.

Figure 13:
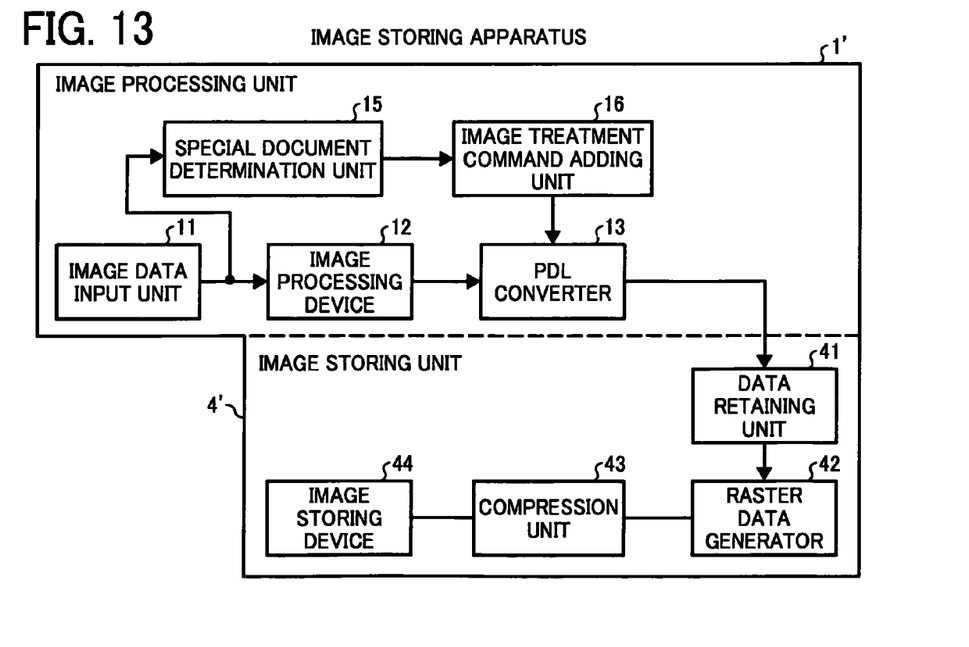
FIG. 13 shows a block diagram of an image storing apparatus according to another exemplary embodiment.
Figure 14:
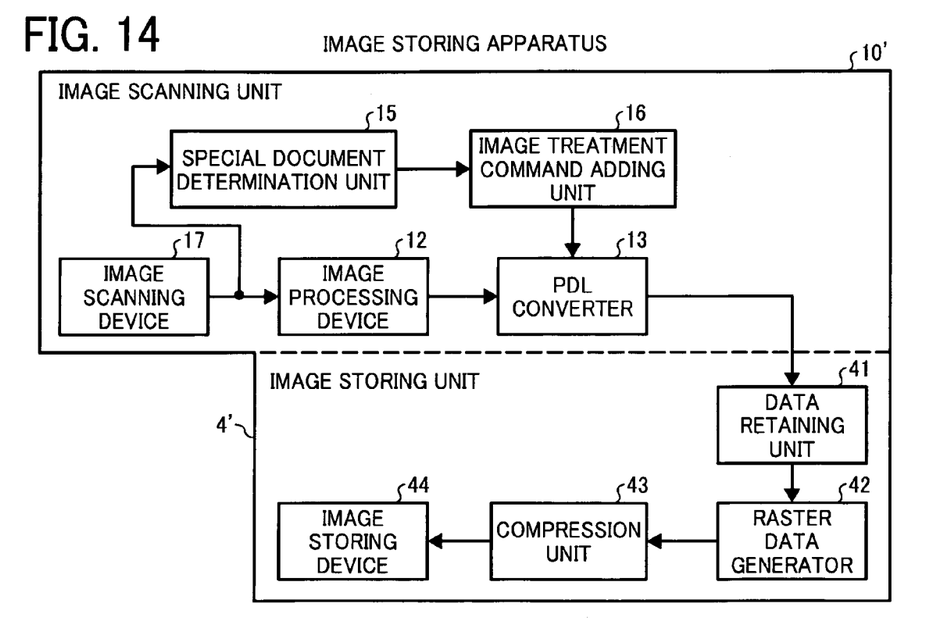
FIG. 14 shows a block diagram of an image storing apparatus according to another exemplary embodiment.

A description is now given to an "image storing apparatuses" according to another exemplary embodiments with reference to FIGS. 13 and 14.

The image storing apparatus of FIG. 13 is configured with the image processing unit 1' of FIG. 11 and an image storing unit 4' equivalent of the image storing unit 4 of FIG. 10. The image storing apparatus of FIG. 13 may be configured as a server system equipped with an image processing unit according to an exemplary embodiment, for example.

Further, the image storing apparatus of FIG. 14 is configured with the image scanning unit 10' of FIG. 12 and the image storing unit 4' equivalent of the image storing unit 4 of FIG. 10. The image storing apparatus of FIG. 14 may be configured as a document filing apparatus equipped with a scanner, which includes an image processing unit according to an exemplary embodiment, for example.

In the above-described exemplary embodiments, a computer can be used with a computer-readable program to control functional units used for image processing. For example, a particular computer may control the image processing unit 1 of FIG. 3 using a computer-readable program which can execute steps shown in the flowchart of FIG. 5. Such computer-readable program can be prepared for each of the above-described exemplary embodiments.

In the above-described exemplary embodiments, a storage device (or recording medium), which can store computer-readable program, may be a flexible disk, a CD-ROM (compact disk read only memory), a memory card, a memory chip, or the like, but not limited these. Further, a computer-readable program can be downloaded to a particular computer (e.g., personal computer PC) via a network, or a computer-readable program can be installed to a particular computer from the above-mentioned storage device, by which the particular computer may be used as the image processing unit according to exemplary embodiments, for example.

In the above-described exemplary embodiments, the special document determination unit 15 determines whether the input image data includes a special document. If the special document determination unit 15 determines that the special document is included, the image treatment command adding unit 16 generates an image treatment command, which may be PDL command, to instruct a given specific image treatment to the image data for one page, and the PDL converter 13 transmits the image treatment command before the end-of-page command or with the end-of-page command simultaneously.

Such special document may be categorized in several types having different levels of classification. For example, special document may be classified as: paper currency, which can be used for purchasing goods and services; stock certificates, which has some legal limitation for use and needs legal procedures for use; and written certificates, which may be allowed for copying but the copy needs to be clearly distinguishable from the original document.

Accordingly, an image treatment command may be generated in consideration of types of special document, such as for example paper currency, stock certificates, written certificates, which may be classified in different levels. Such image treatment command may be output as PDL command, which can instruct different types of image treatment process depending on types of special document. For example, when the PDL data is extracted as raster data by an external unit or the like, different image treatment process may be conducted as below: filling a pattern on a whole-face on a sheet or meshing half-tone dots on a whole area on a sheet that copies paper currency; putting large characters or marks of "COPY-PROHIBITED" on a sheet that copies stock certificates; putting characters of "COPY" as a ground mark on a sheet that copies written certificates.

As above-described, input image data can be converted to PDL data and the PDL data can be output to outside while the special document determination processing is conducted, and then the end-of-page command and the image treatment command may be output to conduct an image treatment to the output PDL data that is already output to the outside.

If the image data is output as raw data (e.g., not converted to PDL data) as in a conventional system, such image data may be output to a medium (e.g., sheet, display) even if the image data includes a special document, and the output image data may be used for illicit purposes. Such illicit purposes usage may be prevented by a conventional method. However, such conventional method may need a longer time for preventing illicit purposes usage, which may not be desirable.

As above described, in exemplary embodiments according to the present invention, image data can be output without waiting a completion of the special document determination processing, by which a total time for image data processing can be shortened, which may be desirable. Further, a descriptive language (e.g., PDL) can be used for various types of image processing systems. By using such descriptive language, an image processing system or apparatus can conduct a given image treatment without special procedure with other units or apparatuses configuring image processing system.

In the above described exemplary embodiments, image data processed by an image processing unit can be output to an external apparatus such as for example image output unit 2 (e.g., printer) as PDL data. Accordingly, the external apparatus may not need a special function for data processing, and thereby a generally used apparatus can be employed as the external apparatus.

Further, the external apparatus that has received PDL data, converted from input image data, cannot generate raster data (e.g., bitmap data) if such external apparatus does not receive an end of data command (e.g., end-of-page command) for the image data, which may be received from the image processing unit. Accordingly, even if PDL data including a special document is output to the external apparatus, the external apparatus cannot print or display such PDL data if an end-of-page command is not received by the external apparatus, by which the special document may not be used for illicit purposes.

Specifically, until a determination result is issued, the PDL converter is instructed to wait for a transmission of an end-of-page command. If the determination result indicates that image data includes a special document, an image treatment command (e.g., PDL command) is generated for the image data for one page, wherein image treatment command instructs a given specific image treatment to the image data. The image treatment command may be transmitted to the external apparatus before transmitting the end-of-page command or simultaneously with the end-of-page command. Then the external apparatus conducts given specific image treatment (e.g., pattern filling) to image data when generating raster data for a given page, by which a wrong purpose usage (e.g., forged certificate) can be prevented.

Accordingly, an image processing apparatus can conduct an image data inputting process and a special document determination process concurrently, and a image data (e.g., PDL data) can be sequentially output to an external apparatus before completing a determination process by a special document determination unit. Accordingly, a total time for data transmission can be shortened and thereby a total time for image processing can be shortened.

As above described, the configuration according to exemplary embodiments can be employed for each of an image processing unit, an image scanning unit, an image output system, an image storing system, an image printing apparatus, an image copying apparatus, and an image storing apparatus, or a system connecting such apparatuses and systems using a data communication bus (e.g., network). Further, the configuration according to exemplary embodiments can effectively prevent forging of special document such as for example paper currency and stock certificates with a reduced processing time compared to a conventional apparatus or system.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An image processing unit, comprising:
   an image data input unit to input image data;
   a page-description language (PDL) converter to convert the input image data input by the image data input unit to page-description language data, and to transmit an end-of-page command when a page-description language conversion for image data for one page is completed;
   a special document determination unit, that receives the input image data from the image data input unit and, to determine whether the input image data includes image data having a special document for each page; and
   an image treatment command adding unit to instruct the PDL converter to wait for a transmission of the end-of-page command until the special document determination unit issues a determination result;
   the image treatment command adding unit generating an image treatment command, using a PDL command, that instructs a given specific image treatment for image data for one page of the image input data input from the image data input unit when the special document determination unit determines that the determination result includes image data having a special document,
   the image treatment command adding unit transmitting the image treatment command before transmitting the end-of-page command or simultaneously with the end-of-page command.

2. The image processing unit according to claim 1, further comprising an image scanner, externally connected to the image processing unit, that scans a document image and outputs image data,
   wherein the image data input unit includes:
   a scanning controller to control the image scanner; and
   a scanned data input device to sequentially input image data scanned by the image scanner.

3. The image processing apparatus unit to claim 1, further comprising a data output unit to sequentially output the page-description language data converted by the PDL converter.

4. An image scanning unit, comprising:
   an image scanning device to read a document image and output image data;
   a page-description language (PDL) converter to convert the image data output by the image scanning device to page-description language data, and to transmit an end-of-page command when a page-description language conversion for image data for one page is completed;
   a special document determination unit, that receives the output image data from the image scanning device, to determine whether the output image data includes image data having a special document for each page; and
   an image treatment command adding unit to instruct the PDL converter to wait for a transmission of the end-of-page command until the special document determination unit issues a determination result,
   the image treatment command adding unit generating an image treatment command, using a PDL command, that instructs a given specific image treatment for image data for one page of the image data output from the image data scanning device when the special document determination unit determines that the determination result includes image data having a special document,
   the image treatment command adding unit transmitting the image treatment command before transmitting the end-of-page command or simultaneously with the end-of-page command.

5. The image scanning unit to claim 4, further comprising a data output unit to sequentially output the page-description language data converted by the PDL converter.

6. An image generation system, comprising:
   the image processing unit according to claim 1; and
   an image output unit connected to the image processing unit via a data communication bus to receive the page-description language data from the image processing unit, the image output unit, comprising:
   a data retaining unit to temporarily retain the page-description language data received from the image processing unit via the data communication bus;
   a raster data generator to receive the page-description language data from the data retaining unit and generates raster data from the page-description language data for a given page,
   wherein the raster data generator generates the raster data from the page-description language data for the given page when the raster data generator receives the end-of-page command, and the raster data generator generates the raster data from the page-description language data for the given page and conducts the given specific image treatment for the generated raster data when the raster data generator receives the image treatment command before or simultaneously with the end-of-page command; and an image output device to output the raster data generated by the raster data generator as an image on a sheet by printing or on a display screen.

7. An image generation system, comprising:

the image scanning unit according to claim 4; and an image output unit connected to the image scanning unit via a data communication bus to receive the page-description language data from the image scanning unit, the image output unit, comprising:
- a data retaining unit to temporarily retain the page-description language data received from the image scanning unit via the data communication bus;
- a raster data generator to receive the page-description language data from the data retaining unit and generates raster data from the page-description language data for a given page,
- wherein the raster data generator generates the raster data from the page-description language data for the given page when the raster data generator receives the end-of-page command, and
- the raster data generator generates the raster data from the page-description language data for the given page and conducts the given specific image treatment for the generated raster data when the raster data generator receives the image treatment command before or simultaneously with the end-of-page command; and
- an image output device to output the raster data generated by the raster data generator as an image on a sheet by printing or on a display screen.

8. An image storing system, comprising:

the image processing unit according to claim 1; and an image storing unit connected to the image processing unit via a data communication bus to receive the page-description language data from the image processing unit, the image storing unit comprising:
- a data retaining unit to temporarily retain the page-description language data received from the image processing unit via the data communication bus;
- a raster data generator to receive the page-description language data from the data retaining unit and generates raster data from the page-description language data for a given page,
- wherein the raster data generator generates the raster data from the page-description language data for the given page when the raster data generator receives the end-of-page command, and
- the raster data generator generates the raster data from the page-description language data for the given page and conducts the given specific image treatment for the generated raster data when the raster data generator receives the image treatment command before or simultaneously with the end-of-page command; and
- an image storing device to store the raster data generated by the raster data generator as an image file.

9. An image storing system, comprising:

the image scanning unit according to claim 4; and an image storing unit connected to the image scanning unit via a data communication bus to receive the page-description language data from the image scanning unit, the image storing unit, comprising:
- a data retaining unit to temporarily retain the page-description language data received from the image scanning unit via the data communication bus;
- a raster data generator to receive the page-description language data from the data retaining unit and generates raster data from the page-description language data for a given page,
- wherein the raster data generator generates the raster data from the page-description language data for the given page when the raster data generator receives the end-of-page command, and
- the raster data generator generates the raster data from the page-description language data for the given page and conducts the given specific image treatment for the generated raster data when the raster data generator receives the image treatment command before or simultaneously with the end-of-page command; and
- an image storing device to store the raster data generated by the raster data generator as an image file.

10. The image generation system according claim 6, wherein the image generation system includes an image printing apparatus, and an image copying apparatus.

11. The image generation system according to claim 7, wherein the image generation system includes an image printing apparatus, and an image copying apparatus.

12. The image generation system according to claim 8, wherein the image generation system includes an image storing apparatus.

13. The image generation system according to claim 9, wherein the image generation system includes an image storing apparatus.

14. A method of controlling image processing for a special document, the method comprising the steps of:
- inputting image data using an image data input unit;
- converting the input image data input from the image data input unit to page description language data using a page description language (PDL) converter;
- transmitting an end-of-page command when the page-description language conversation for image data for one page is completed;
- determining whether the input image data for a given one page of the input from the image data input unit includes a special document using a special document determination unit;
- instructing waiting for a transmission of the end-of-page command until a determination result of whether the one page includes a special document is issued by a special document determination unit;
- generating an image treatment command, using PDL command, that instructs a given specific image treatment for the image data for the given one page when the special document determination unit determines that the determination result indicates the image data includes a special document; and
- transmitting the image treatment command before transmitting the end-of-page command or simultaneously with the end-of-page command.

15. The method according claim 14, further comprising the step of sequentially outputting the page-description language data using a data output unit.

* * * * *